United States Patent [19]

Ouimet

[11] Patent Number: 5,315,737
[45] Date of Patent: May 31, 1994

[54] WORM DRIVE CLAMP WITH BAND GUIDE CHANNELS

[76] Inventor: Serge Ouimet, 342 Daniel Johnson, Ile Bizard, Quebec, Canada, H9C IE3

[21] Appl. No.: 905,680

[22] Filed: Jun. 29, 1992

[51] Int. Cl.⁵ .......................................... F16L 33/08
[52] U.S. Cl. ............................................ 24/274 R
[58] Field of Search ............... 24/19, 274 R, 274 P, 24/279

[56] References Cited

U.S. PATENT DOCUMENTS

| | | | |
|---|---|---|---|
| 2,767,455 | 10/1956 | Schaefer | 24/274 R |
| 3,028,650 | 4/1962 | Tinsley | 24/274 R |
| 4,047,268 | 9/1977 | Buttriss | 24/274 R |

FOREIGN PATENT DOCUMENTS 593258 10/1947 United Kingdom ............. 24/274 R

Primary Examiner—James R. Brittain

[57] ABSTRACT

An improved worm drive clamp comprised of a flexible metal clamping band and a housing containing a tightening screw is secured to one end of the band. The tightening screw is axially and angularly displaceable within the housing for engagement and disengagement from an engageable free end of the band which is passed through the housing to form a band loop for securement about an object. The housing is comprised of opposed guide channels through which opposed edge portions of the free end portion of the band is caused to pass to position the free end portion in a fixed arcuate plane for engagement and disengagement with the displaceable tightening screw which is located thereabove in a screw retention portion of the housing. The tightening screw pivots in a slot formed in an end wall of the housing and displaced outwardly in a further slot formed in the opposed end wall of the housing. The housing is also formed from a unitary metal piece.

4 Claims, 3 Drawing Sheets 5,315,737

WORM DRIVE CLAMP WITH BAND GUIDE CHANNELS

TECHNICAL FIELD

The present invention relates to an improved worm drive clamp wherein guide channels are formed with the threaded bolt housing to maintain the free end portion of the band at a precise position within the housing for engagement and disengagement by a displaceable tightening screw.

BACKGROUND ART

In my previous U.S. Pat. No. 4,993,124 issued on Feb. 19, 1991, I disclose a worm drive clamp of a construction wherein the free end portion of the flexible metal clamping band is spring-biased against a tightening screw which is axially rotatable on a fixed axis. The advantages of being able to insert the band through the housing without engagement with the threaded screw is disclosed therein. Another advantage is to easily and quickly insert the free end portion of the band within the housing and providing engagement of the screw only after the band has completely encircled the object which is to be secured thereto. This desirable feature provides for the clamp to be quickly connected and disconnected from an object.

The present invention is directed to a worm drive clamp of the type wherein the tightening screw is hingeably secured within the housing and can be hinged out of engagement with the free end portion of the band. Such clamps are known in the art, such as that described and shown in U.S. Pat No. 2,825,113 issued on Mar. 4, 1958 and U.S. Pat. No. 4,445,254 issued on May 1, 1984. As described in these patents the tightening screw is displaceable both in the axial direction and upwardly away from the free end portion of the band which is passed through the housing. A disadvantage of these clamps is that the tightening screw provides obstruction to the free end portion of the band when inserted in the housing. When the band is inserted in the housing it moves upwardly towards the screw due to the arcuate shape of the band and also due to the fact that the passage provides for the band to spring upwardly therein. In other words, the band enters one end of the housing and out the other without any guided restriction between the opposed ends of the passage. This is due to the fact that the screw has to move upwards and downwards in the housing. The construction of these clamps also makes it very difficult to restrict the passage of the band within the housing. Accordingly, many of these types of clamps have not achieved commercial success. These clamps also have various component parts and are difficult to assemble, and often resulting in malfunction.

U.S. Pat. No. 4,307,495 discloses a housing with opposed guide channels for positioning the free end portion of a flexible band in contact with a tightening screw. However, such is difficult and complex to manufacture, and the screw is maintained at a fixed position. Such complexity becomes compounded when the bottom wall of the housing has an arcuate shape.

SUMMARY OF INVENTION

It is an object of the present invention to provide an improved worm drive clamp having a hinging screw that substantially overcomes the above-mentioned disadvantages of the prior art.

Another object of the present invention is to provide an improved worm drive clamp having a hinging screw and wherein the clamp housing is provided with guide channels to guide the free end portion of the band through the housing to maintain it in a specific arcuate plane for engagement and disengagement by an axially and pivotally displaceable screw secured thereabove within the housing.

Another feature of the present invention is to provide an improved worm drive clamp having a hinging screw and wherein the free end portion of the band is easily and quickly connected and disconnected from the housing.

According to the above features, from a broad aspect, the present invention provides a worm drive clamp which comprises a flexible metal clamping band having a housing secured to a securing end thereof. The band has a plurality of spaced apart openings in at least the free end portion thereof. The housing has a screw retention portion and a lower band receiving portion. The band receiving portion has opposed guide channels through which opposed edge portions of the free end portion of the band is caused to pass to position the free end portion for engagement and disengagement with a displaceable axially rotatable tightening screw located thereabove in the screw retention portion. The screw has a screw thread portion, a pivoting end portion, and an engageable head at an opposed end to said pivoting end portion, and an annular groove intermediate the engageable head and the threaded portion. The screw retention portion of the housing has an end wall with a retention opening for receiving the screw pivoting end portion captive therein, but providing longitudinal axial displacement thereof. The screw retention portion of the housing has an opposed end wall with a head receiving slot. The head receiving slot has a first portion having opposed arcuate side walls disposed about a center point which lies on the central axis of the retention opening. The first portion accommodates the passage of the head therein. A second portion, which is a U-shape slot, is disposed at a base of the head receiving slot for receiving the annular groove closely spaced therein but preventing the passage of the head when the screw is displaced to a disengaged angular position. The opposed guide channels provide a friction abutment for the head to retain the screw thread portion in an engageable portion with the spaced apart openings in the band free end portions. The band free end portions remain substantially in an arcuate plane by the opposed guide channels during engagement and disengagement thereof by the tightening screw.

BRIEF DESCRIPTION OF DRAWINGS

A preferred embodiment of the invention will now be describe with reference to the accompanying drawings in which.

DESCRIPTION OF PREFERRED EMBODIMENTS

Figure 1:
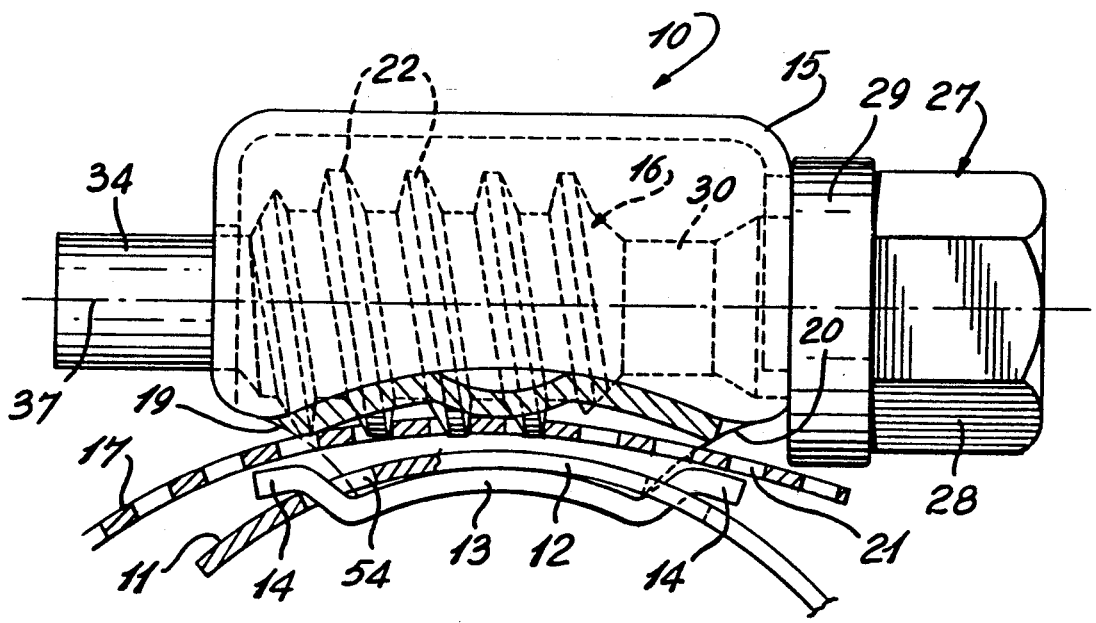
FIG. 1 a side view of the housing showing the position of the tightening screw in phantom lines when in its engaged position.

Referring now to the drawings, and more particularly to FIG. 1, there is shown generally at 10 the worm drive clamp of the present invention. It comprises essentially of a flexible clamping band 11 having a securing end 12 which is secured to and above the bottom wall 13 by tabs 14 of a securing bolt housing 15. A securing threaded screw 16 is retained within the housing 15. The free end portion 17 of the clamping band 11 is insertable through an arcuate slot 18 located above the secured end 12 of the band in the lower portion of that housing and through an inlet end 19 and out through an outlet end 20. The band 11 is provided with a plurality of spaced apart openings 21 in at least a free end portion 17 thereof for engagement with the threads 22 of the threaded tightening screw 16.

Referring now additionally to FIGS. 2 to 5, it can be seen that the housing 15 has a top dome screw retention portion 23 and a lower band receiving portion 24. The band receiving portion is provided with opposed guide channels 25 through which opposed edge portions 17' of the band free end portion 17 is caused to pass to position the free end portion for engagement and disengagement with the threads 22 of the fastening screw 16.

Figure 6:
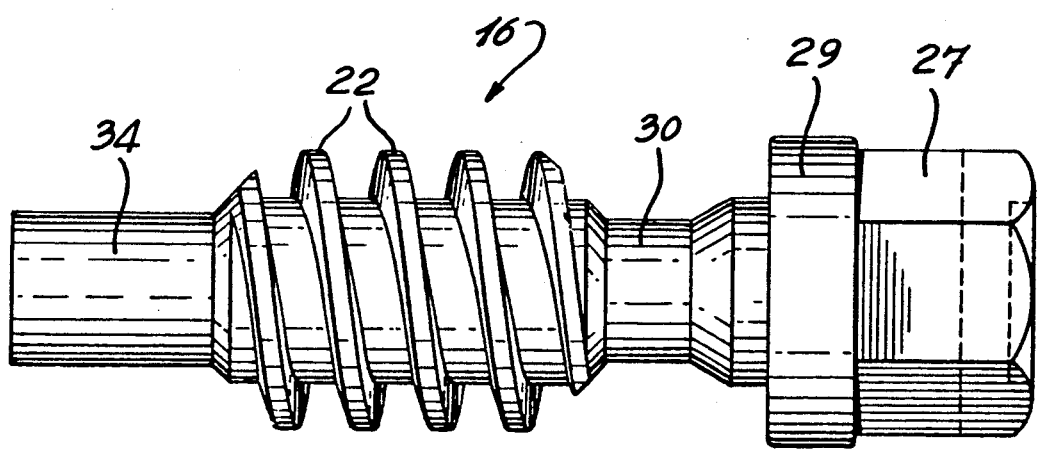
FIG. 6 is a side view of the tightening screw.
Figure 7:
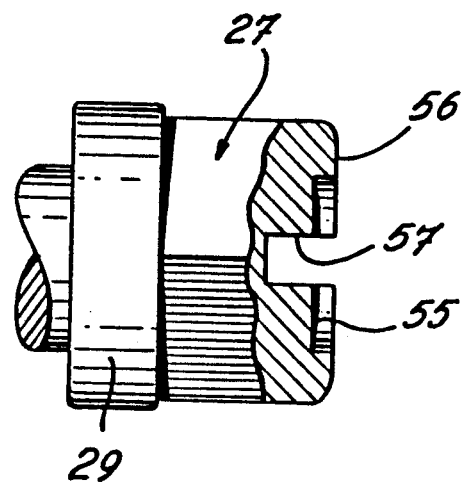
FIG. 7 is a side view of the head of a tightening screw, partly fragmented.
Figure 8:
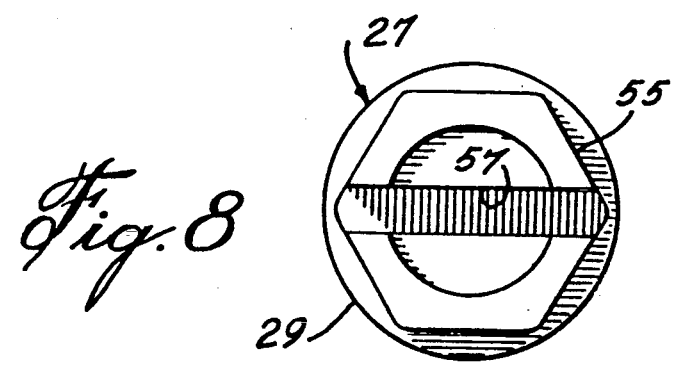
FIG. 8 is an end view of the head of the screw.

As shown in FIGS. 6 to 8, the fastening screw 16 has a screw thread portion about which the thread 22 is disposed. At one end of the screw thread portion is provided a pivoting end portion 26 which is of constant circular cross-section. At the other end of the tightening screw there is provided an engageable head 27 having an hexagonal side wall 28 and a circular band collar 29. An annular groove 30 is provided intermediate the engageable head 27 and the threaded portion.

Figure 2:
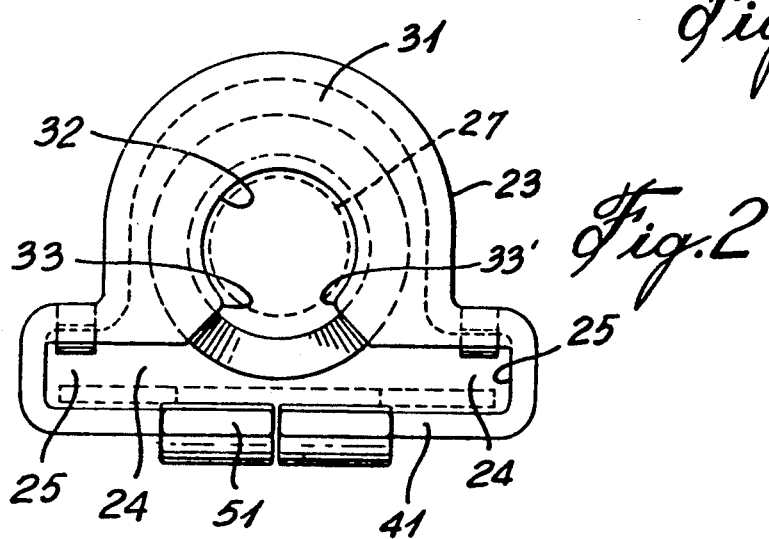
FIG. 2 is an end view of the housing showing the screw retention opening.
Figure 9:
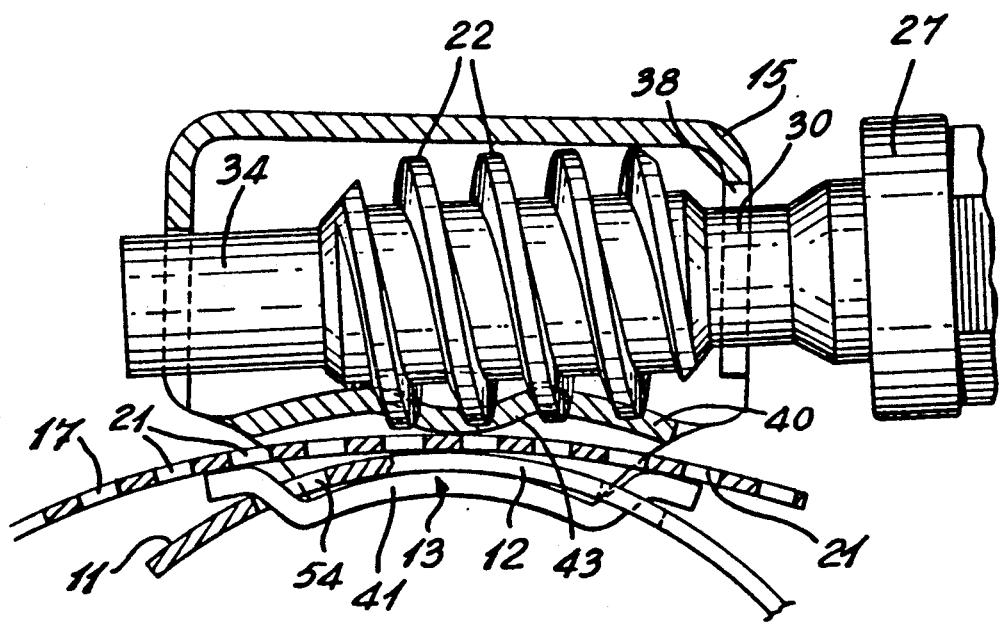
FIG. 9 is a sectional side view of the housing showing the tightening bolt in its disengaged position.

As shown in FIG. 2 the housing is provided with an end wall 31 in which a retention opening 32 is formed. The retention opening has a circular U-shape cavity and a throat opening 33 and define opposed, spaced pivot shoulders 33' on which the end portion 26 pivots. The pivoting end portion 27 of the fastening screw is retained captive in this circular U-shape opening 32 and permits the screw to be displaced axially along its longitudinal axis 34, and also permits pivoting movement of the tightening screw, as shown in FIG. 9, due to the thread opening 33 and shoulders 33. The screw is captive between the opposed end walls 31 and 34 of the housing.

Figure 3:
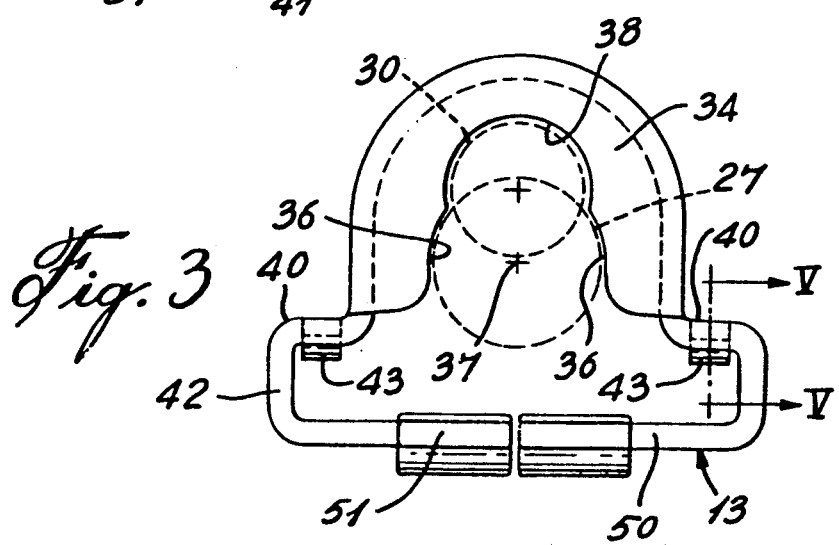
FIG. 3 is an opposed end view of the housing showing the screw head receiving slot.

The other end wall 34, as shown in FIG. 3, has a head receiving slot 35 formed therein. The head receiving slot has a first portion provided with opposed arcuate side walls 36 disposed about a common center point 37 which is located on the longitudinal axis 34 of the screw when the screw is in its engaged position, as shown in FIG. 1. The radius of the opposed arcuate side walls is of a dimension to accommodate the head 27 or collar 29 of the tightening screw therein when in its engaged position. The head receiving slot 35 also has a second portion which is a U-shape slot 38 disposed at a base or a bottom end of the first portion of the slot for receiving the annular groove 30 of the tightening screw closely spaced therein when the tightening screw is displaced to its disengaged position, as shown in FIG. 9. This second slot 38 is dimensioned to prevent the passage of the head therein.

Referring again to FIGS. 2 to 5, it can be seen that the opposed guide channels 25 are integrally formed with the housing 15 and extend outwardly to define wings on opposed side walls of the screw retention portion 23 of the housing 15. These guide channels are arcuate channels having top and bottom arcuately extending walls 40 and 41 respectively. An outer side wall 42 interconnects the top and bottom walls. A tab 43 of arcuate shape, clearly shown in FIG. 5, is punched in the top wall 40 of the arcuate guide channels at substantially mid-length thereof to maintain the band free end portion in a stationary plane spaced from the tightening screw a predetermined distance to ensure engagement and disengagement thereof when the screw is in its position as shown in FIG. 1 or FIG. 9. Because of these guide channels, once the screw is turned to unlock the band from an object to which it is secured a sufficient amount to loosen the band, the housing is displaced forwardly by holding the free end portion of the band to cause the tightening screw to pivot upwardly wherein the annular groove 30 of the screw moves into the top slot 38 of the head receiving slot 35 to retaining the bolt threaded portion out of the plane of the arcuate channel, as shown in FIG. 9. The free end portion of the band 17 can then be pulled out of the housing without engagement with the threaded screw because the end portion of the band is constantly guided in a fixed arcuated plane and is not freely movable to engage with the screw. This restriction of the band is achieved by the guide channels 25 and the tabs 43 formed in the top wall thereof and in frictional engagement with the top surface of the free end portion of the band.

Figure 4:
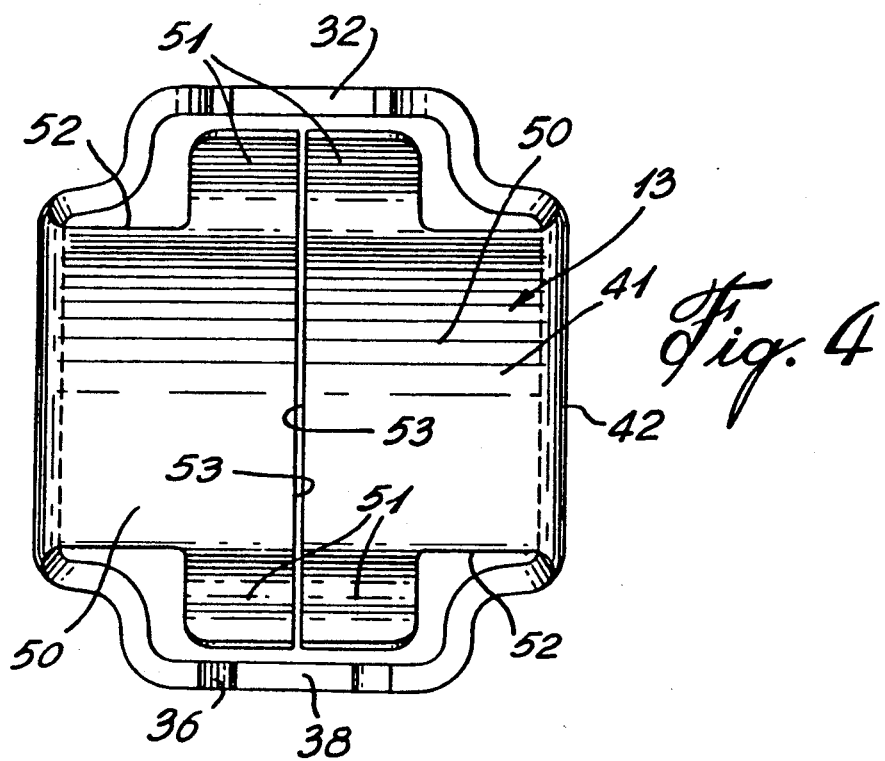
FIG. 4 is a bottom view of the housing.
Figure 5:
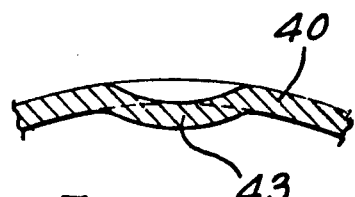
FIG. 5 is a section view along cross-section lines V—V of FIG. 3.

As shown in FIGS. 2 to 4, the arcuate bottom wall 41 of the guide channels is provided with extension wall portions 50 which are disposed in a common plane and which form a bottom arcuate support wall for the housing and an attachment wall to secure same under the securing end 12 of the clamping band 11. The bottom support walls 50 each have attachment means in the form of tongues 51 disposed along a side edge 52 thereof and adjacent their end edge 53. These tongues 51 of both walls 50 are in side-by-side alignment with one another, and provide attachment to connecting holes 54 formed in the securing end 12 of the clamping band 11, as shown in FIG. 9.

As shown in FIGS. 7 and 8, the engaging head 27 of the securing screw 16 is also provided with an hexagonal cavity 55 in the end face 56 thereof for engagement with an Allen key. A straight slot 57 provided in the hexagonal cavity for engagement with a screwdriver end to impart axial rotation to the screw.

It is within the ambit of the present invention to cover any obvious modifications of the preferred embodiment described herein, provided such modifications fall within the scope of the appended claims.

I claim:

1. A worm drive clamp comprising a flexible metal clamping band having a housing secured to a securing end thereof, said band having a plurality of spaced apart engageable openings in at least a free end portion thereof, said housing having a screw retention portion and a lower band receiving portion, said band receiving portion having opposed guide channels through which opposed edge portions of said free end portion of said band is caused to pass to position said free end portion for engagement and disengagement with a displaceable axially rotatable tightening screw located thereabove in said screw retention portion; said screw having a screw thread portion, a pivoting end portion, an engageable head at an opposed end to said pivoting end portion, and an annular groove intermediate said engageable head and said thread portion; said screw retention portion of said housing having an end wall with a retention opening for receiving said screw pivoting end portion captive therein but providing longitudinal axial displacement and pivotal displacement thereof, said screw retention portion of said housing having an opposed end wall with a head receiving slot; said head receiving slot having a first portion with opposed arcuate side walls disposed about a center point which lies on a central axis of said retention opening, said first portion accommodating the passage of said head therein, and a second portion which is a U-shape slot disposed above said head receiving slot for receiving said annular groove closely spaced therein but preventing the passage of said head when said screw is displaced outwardly to a disengaged angular position; said opposed arcuate side walls providing a frictional abutment for said head to retain said screw thread portion in an engageable position with said spaced apart openings in said band free end portion, said band free end portion remaining substantially in a fixed arcuate plane by said opposed guide channels during engagement and disengagement thereof from said housing, said guide channels being formed integrally with said housing and extending outwardly from opposed side walls of said screw retention portion of said housing to define wing portions, said guide channels further being of rectangular cross-section and arcuately extending and further having a top and bottom arcuate wall and an outer interconnecting side wall, an arcuate tab is punched in said arcuate top wall to define a restricted throat section in said arcuate channels at mid-length thereof to maintain said band free portion in said fixed arcuate plane spaced from said tightening screw a predetermined distance.

2. A worm drive clamp as claimed in claim 1 wherein said arcuate bottom wall of said arcuate channels have an extension wall portion disposed in a common plane and forming a bottom support wall of said housing, said bottom support wall having attachment means formed in opposed side edges thereof for securing said housing to said securing end of said clamping band.

3. A worm drive clamp as claimed in claim 2 wherein said attachment means are integrally formed tongues for attachment in connecting holes formed in said securing end of said clamping band.

4. A worm drive clamp as claimed in claim 3 wherein said housing, tightening screw and clamping band are formed of metal, said worm drive clamp being a hose clamp.

* * * * *